Dec. 13, 1955       G. E. HANSEN       2,726,404
LINERS FOR CLOSET TANKS OR THE LIKE
Filed July 9, 1952
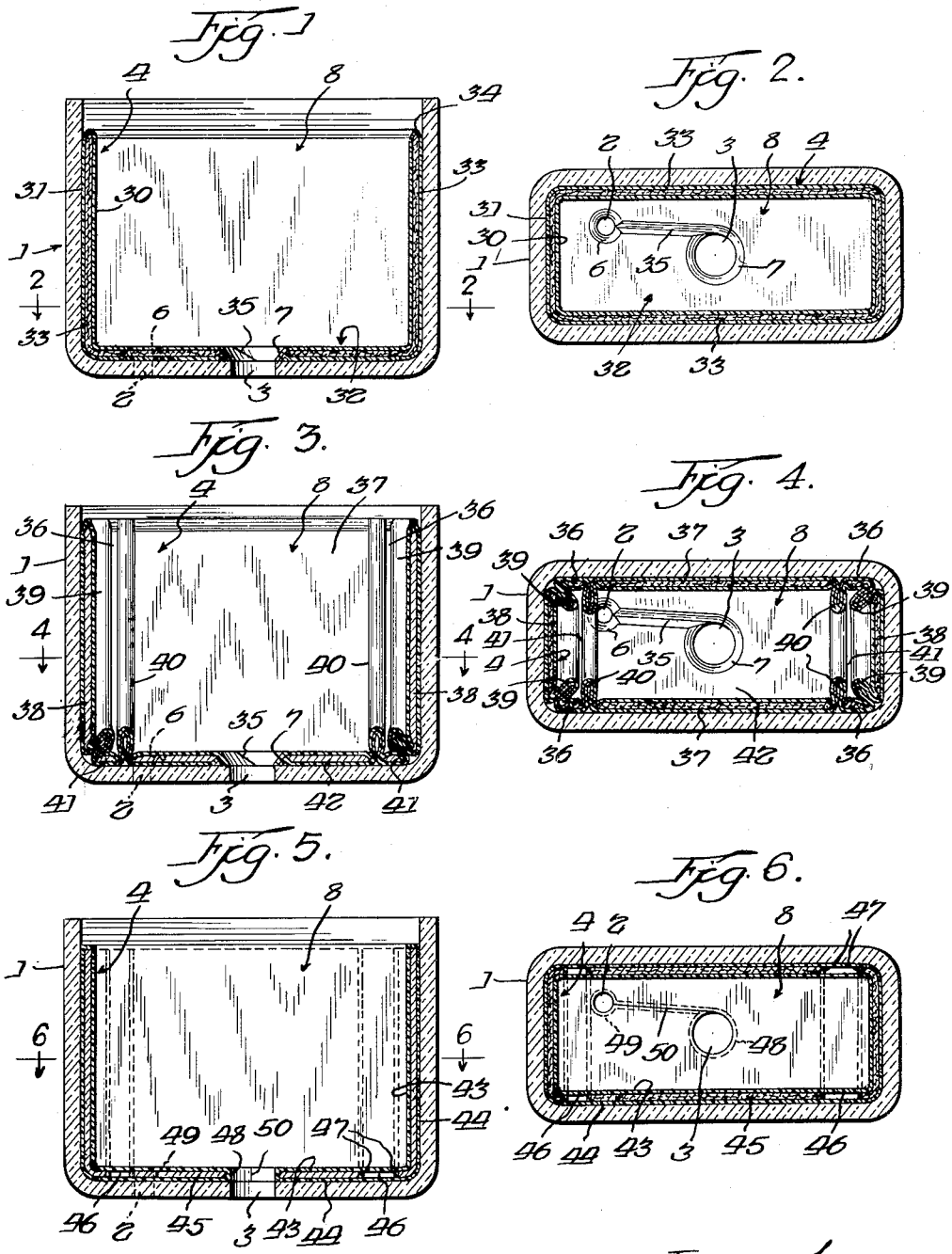
Inventor:
George E. Hansen.
By Joseph O. Lange
Atty.

United States Patent Office 2,726,404
Patented Dec. 13, 1955

2,726,404

LINERS FOR CLOSET TANKS OR THE LIKE

George E. Hansen, Elmwood Park, Ill., assignor to Crane Co., Chicago, Ill., a corporation of Illinois Application July 9, 1952, Serial No. 297,861

1 Claim. (Cl. 4—68)

This invention relates to liners for closet tanks or the like to prevent or minimize the formation of condensate on the outer surfaces thereof to cause what is commonly referred to as sweating.

In order to appreciate the substance of this contribution, it should be understood at the outset that for many years past numerous methods have been tried in providing for an insulating liner for use on closet tanks and the like to prevent the formation of condensate on the outside surfaces of such tanks during a combination of conditions involving cold water, high humidity, and relatively high temperatures.

Rubber linings of many types and designs have been tried, but so far as I am aware, no one previously has devised a liner in which a plastic composition or the like may be used and in which the relatively loose and convenient positioning of the liner within a tank may be employed whereby the relatively smaller areas between the liner and the inside wall of the tank will reduce the volume of the water contained therewithin but slightly and yet as a result the relatively entrapped water is maintained at a comparatively higher temperature to minimize the condensate formation on the outer surfaces of the tank.

Another object is to provide for a liner of a plastic material or the like in which a double wall is preferably used and in which insulating material may be employed such as an aluminum foil, for example, to effect further insulating properties to the liner.

A further important object is to provide for a plastic liner construction or the like in which the walls thereof are made in a plurality of parts or cells to provide therebetween air cells, each pocket of which contains air in sufficient quantities to effect an insulating effect between the water within the tank liner from having direct contact with the interior surfaces of the tank proper.

Other objects and advantages will become more readily apparent upon proceeding with the specification read in light of the accompanying drawings in which:

Fig. 1 is a sectional view of a tank and liner construction employing a slotted rubber base, an insulating material and a plastic liner combination.

Fig. 2 is a sectional view taken on the line 2—2 of Fig. 1.

Fig. 3 is a sectional view of a double plastic liner adjustable for various sizes of tanks.

Fig. 4 is a sectional view of the novel liner taken on the line 4—4 of Fig. 3.

Fig. 5 is a sectional assembly view of a double plastic liner in which the walls thereof are provided with insulation inside the liner and combined with suitably spaced air pockets.

Fig. 6 is a sectional view of the structure referred to in Fig. 5 on the line 6—6 therein.

Similar reference numerals refer to similar parts throughout the several views.

Referring now to Fig. 1, a sectional view of a closet tank or the like, generally designated 1, is provided with the usual inlet aperture 2 and the outlet aperture 3 for the movement of water normally retained therewithin, and within which a plastic liner generally designated 4 is fitted. The necessary fluid sealing connections are made with the inlets and outlets previously referred to.

The double plastic liner 4 is shown mounted within the tank 1. The entire liner is hollow and is provided with the inner walls 30 and the outer walls 31. In this construction, the base of the liner, as at 32, generally is also formed hollow and has the interior fitted with insulating material 33 forming a continuation of the insulating material of the side wall. The upper end is sealed as at 34 by suitably cementing around the upper edges of the liner. In this structure, as shown more clearly in Fig. 2, between the respective apertures as at 2 and 3, a slot 35 extends therebetween which permits the integral plastic liner to be mounted over the usual tank trimmings within the tank 1. Thus, the liner may be easily installed over such existing trimmings without the necessity for removing the latter members from the tank. The type of plastic employed may, of course, vary and this is also true with respect to the insulation material used.

In referring now to Figs. 3 and 4 an adjustable type of plastic liner, generally designated 4, is shown which consists of a plurality of divided cells or hollow sections 36, 37, and 38. These cells or sections are so connected as to provide for a corner overlap as at 39 and an intermediate overlap portion 40, which allows for the folding over of such liner portions to make the liner easily adjustable for many sizes of tanks. In addition, the base portion is similarly made with a series of hollow end or cell members, as at 41 and intermediate base cell 42, the latter being suitably relieved as at 6 and 7. In this construction, the user may cut the insulation fitting within the hollow portions of the members 36 to 38 inclusive, with such insulating pieces as may be found desirable to suit the nature of the tank. In this construction similarly, the slot 35 may be employed between the openings 2 and 3 for the respective inlet and outlet.

In Figs. 5 and 6, a double plastic liner, generally designated 4, is mounted within the tank 1 and in this construction, a pair of walls form the hollow sides or inner ends 43 and outer walls 44 which are provided with an insulation therebetween as indicated. The intermediate end portions connecting the sides are provided with air spaces, and insulation 45 and intermediate air cells 46 of U-shaped configuration cover the base filler tank and front. It will be clear that in view of the fact that the air spaces are provided as at 46 and insulation 45, the liner possesses greater flexibility in being made, with diaphragm members 47 to keep insulation in place and suitable for meeting variations in the many sizes of tanks in which the device may be installed. In this case, similarly, the bottom of the tank may be made with either an air fill or space as designated at 42, or it may be filled with an insulating material as desired. This type of liner having an opening 48 and another at 49 for the tank apertures possesses a high degree of adjustability to meet the various sizes and shapes of the tanks. The apertures may also be connected in the usual manner by the slot 50 as for the purpose described in connection with the other figures.

While a number of varieties of tank liners, insulators, and air space constructions and combinations have been described in connection with the various figures shown, it will, of course, be clear that many other forms may be employed falling within the spirit of the invention, and therefore, it is the intent only to be limited by the scope of the claim interpreted in light of the prior art.

I claim:

A deformable adjustable liner for a closet tank or the like, the said liner comprising inner and outer layers of water impervious material predeterminately connected to form therebetween pocket-like cellular sections having connecting means substantially at end limits thereof between certain of said cellular sections foldable and forming relatively thin integral liner portions, the said connecting means being formed by converging and joining certain end portions of said inner and outer layers to form the said cellular sections whereby upon folding the said connecting means inwardly the size of the liner may be suitably adjusted to fit the tank interior, the bottom portion of said liner also having inner and outer layers of water impervious material joined to form additional cellular sections and having apertured means for effecting attachment of the liner to the tank base, insulating pieces receivable within the said cellular sections, the said apertured means and said foldable connecting means lying between the cellular sections of the liner receiving the said insulating pieces.

References Cited in the file of this patent

UNITED STATES PATENTS

| | | |
|---|---|---|
| 1,207,963 | MacMillan | Dec. 12, 1916 |
| 1,277,165 | Winters | Aug. 27, 1918 |
| 1,484,606 | Hanford | Feb. 19, 1924 |
| 1,911,724 | Stein | May 30, 1933 |
| 2,324,756 | Bombard | July 20, 1943 |
| 2,395,606 | Zinkil et al. | Feb. 26, 1946 |
| 2,562,330 | Peterson | July 31, 1951 |